United States Patent
Sekine et al.

[11] Patent Number: 5,910,966
[45] Date of Patent: Jun. 8, 1999

[54] APPARATUS AND METHOD FOR MAINTAINING DATA TRANSFER

[75] Inventors: Kazutoyo Sekine, Irvine; Dan Lotocky, Fullerton, both of Calif.

[73] Assignees: Sony Corporation, Tokyo, Japan; Sony Trans Com Inc., Irvine, Calif.

[21] Appl. No.: 08/787,701

[22] Filed: Jan. 28, 1997

[51] Int. Cl.$^6$ .................................................. H04L 27/00
[52] U.S. Cl. ............................................................ 375/259
[58] Field of Search ..................................... 375/259, 219; 380/310.01; 381/77

[56] References Cited

U.S. PATENT DOCUMENTS

| | | | |
|---|---|---|---|
| 4,852,045 | 7/1989 | Kraul et al. | 364/926.1 |
| 5,596,647 | 1/1997 | Wakai et al. | 381/77 |
| 5,666,291 | 9/1997 | Scott et al. | 364/200.8 |

*Primary Examiner*—Tesfaldet Bocure
*Attorney, Agent, or Firm*—Blakely, Sokoloff, Taylor & Zafman LLP

[57] ABSTRACT

A signal transferring circuit for transferring data from a central system to electronic units coupled in series is disclosed. The signal transferring circuit comprises a first terminal for receiving a data signal and a second terminal for transmitting the data signal. It further comprises a first buffer having an input terminal and an output terminal. The input terminal is coupled to the first terminal, and the first buffer is enabled to transfer the data signal from the first terminal to a predetermined destination under a first condition. The signal transferring circuit also comprises a second buffer having an input terminal that is coupled to the predetermined destination and an output terminal that is coupled to the second terminal. The second buffer is enabled for transferring the data signal from the predetermined destination to the second terminal under the first condition. The signal transferring circuit further comprises a third buffer having an input terminal coupled to the first terminal and an output terminal coupled to the second terminal. The third buffer is enabled under a second condition to transfer the data signal from the first terminal to the second terminal.

20 Claims, 3 Drawing Sheets

APPARATUS AND METHOD FOR MAINTAINING DATA TRANSFER

BACKGROUND OF THE INVENTION

1. Field of the Invention

The present invention relates to the field of communications. More particularly, the present invention relates to an integrated electronic system having multiple seat electronic units coupled in series, typically situated in commercial aircraft, that preferably supports interactive entertainment and other amenities available to its passengers, which features a method and apparatus of maintaining data transfer between the seat electronic units in the event that a local power supply located within one of the seat electronic unit malfunctions.

2. Description of the Related Art

Over the past few decades, commercial aircraft has become a necessary mode of travel for personal and business reasons. To improve passenger comfort, commercial aircraft typically offer a number of entertainment activities that can be enjoyed by the passenger, such as video games, movies and various selections of music. In addition, various electronic systems for supporting communications and/or other in-flight functions are provided.

Such electronic systems typically comprise seat electronic units which receive in-flight entertainment programs from a central system and which subsequently deliver these programs to one or more passengers on the aircraft. There are typically two methods for communicating these programs from the central system to the electronic units. The first is a radio communication scheme, typically having a star topology, in which the central system communicates with the electronic units via radio frequency. This radio communication scheme allows direct communication between any electronic unit and the central system through radio frequency. As a result, the failure of one electronic unit will have no impact on the operation or data transfer of the other units. This system, however, requires the use of radio frequency modulators and demodulators, which have to be coupled using coaxial cables that are both expensive and bulky. In addition, in radio frequency systems, shielding of sensitive electronics from electromagnetic interference is typically required; thus adding additional weight to the system. Since weight is a significant design constraint in an in-flight entertainment system, such a system has definite limitations.

The second is a digital data communication scheme in which the central system delivers programs for electronic units that are serially connected in a daisy chain configuration. This data communication scheme is easy to implement and cost effective. However, since each electronic unit is a standalone unit powered by a local power supply, and since the electronic units are serially connected, the loss of power in any one unit typically results in the interruption of the in-flight entertainment services to units downstream.

Accordingly, there is a need in the technology for an apparatus and method for maintaining data transfer between the seat electronic units coupled in series on an aircraft in the event that a local power supply within one of the seat electronic units malfunctions.

BRIEF SUMMARY OF THE INVENTION

A signal transferring circuit for transferring data from a central system to electronic units coupled in series is disclosed. The signal transferring circuit comprises a first terminal for receiving a data signal and a second terminal for transmitting the data signal. It further comprises a first buffer having an input terminal and an output terminal. The input terminal is coupled to the first terminal, and the first buffer is enabled to transfer the data signal from the first terminal to a predetermined destination under a first condition. The signal transferring circuit also comprises a second buffer having an input terminal that is coupled to the predetermined destination and an output terminal that is coupled to the second terminal. The second buffer is enabled for transferring the data signal from the predetermined destination to the second terminal under the first condition. The signal transferring circuit further comprises a third buffer having an input terminal coupled to the first terminal and an output terminal coupled to the second terminal. The third buffer is enabled under a second condition to transfer the data signal from the first terminal to the second terminal.

DETAILED DESCRIPTION OF THE INVENTION

Figure 1:
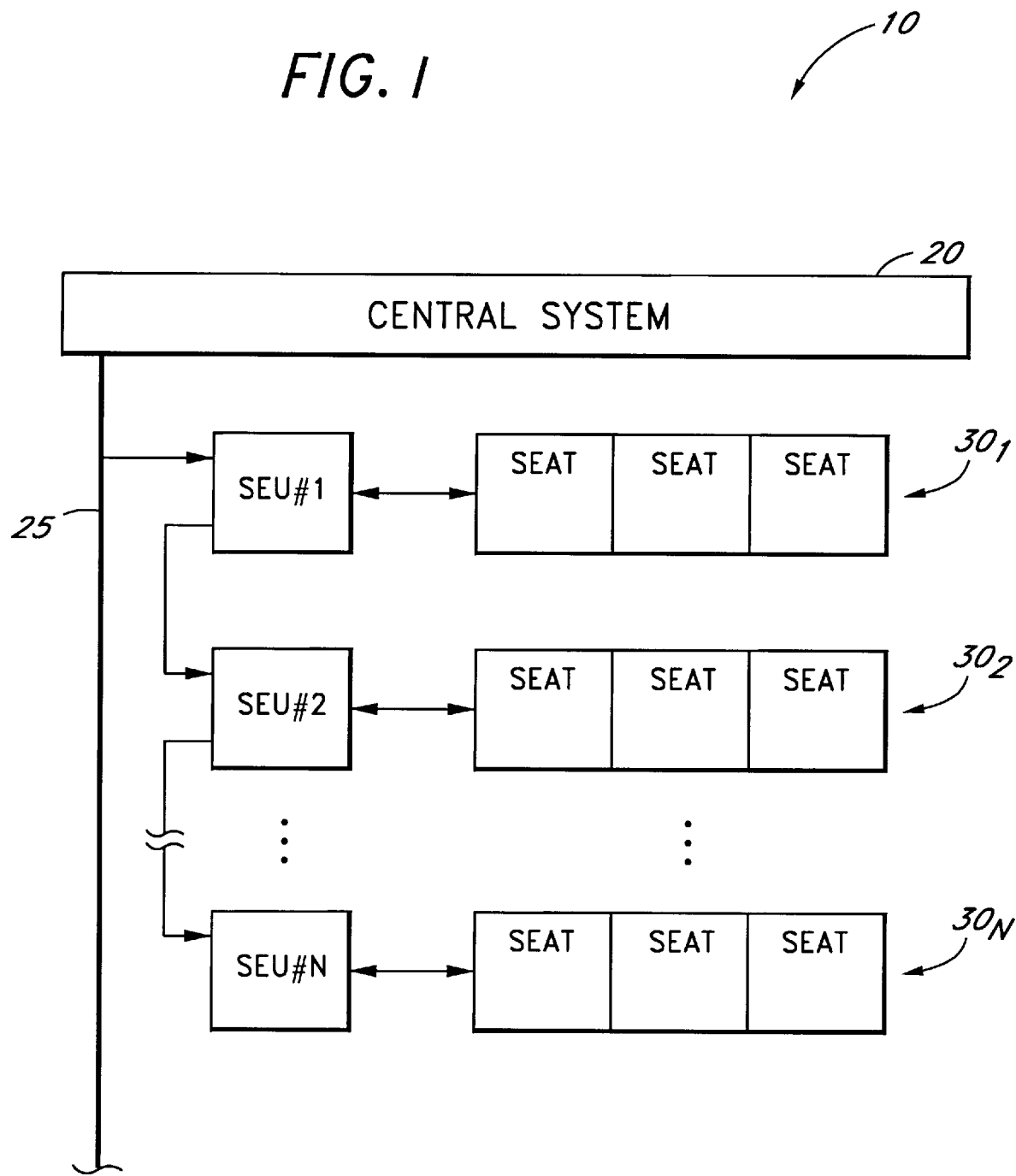
FIG. 1 is a simplified block diagram of a communications system which utilizes the data routing system of the present invention.

FIG. 1 is a simplified block diagram of a communications system 10 which utilizes the data routing system of the present invention. The data routing system of the present invention may be particularly adapted for use in an in-flight entertainment system such as that described in U.S. patent application Ser. Nos. 08/716,541 and/or 08/714,772, which were filed on Sep. 16, 1996, and entitled "Combined digital Audio/Video on Demand and Broadcast Distribution System" and which are assigned to the assignee of the present application. U.S. patent application Ser. Nos. 08/716,541 and/or 08/714,772 are incorporated herein by reference. The communications system 10 includes a central system 20 which provides in-flight entertainment programs and other amenities through a central bus 25 to a number of seat electronic units SEU#1, SEU #2, . . . SEU#N. The seat electronic units (SEUs) are coupled together in a daisy chain configuration. Each SEU receives interactive entertainment and other amenities from the central system 20 and provides these programs and/or services to a plurality of passengers located in each row of seats $30_1$–$30_N$.

Figure 2:
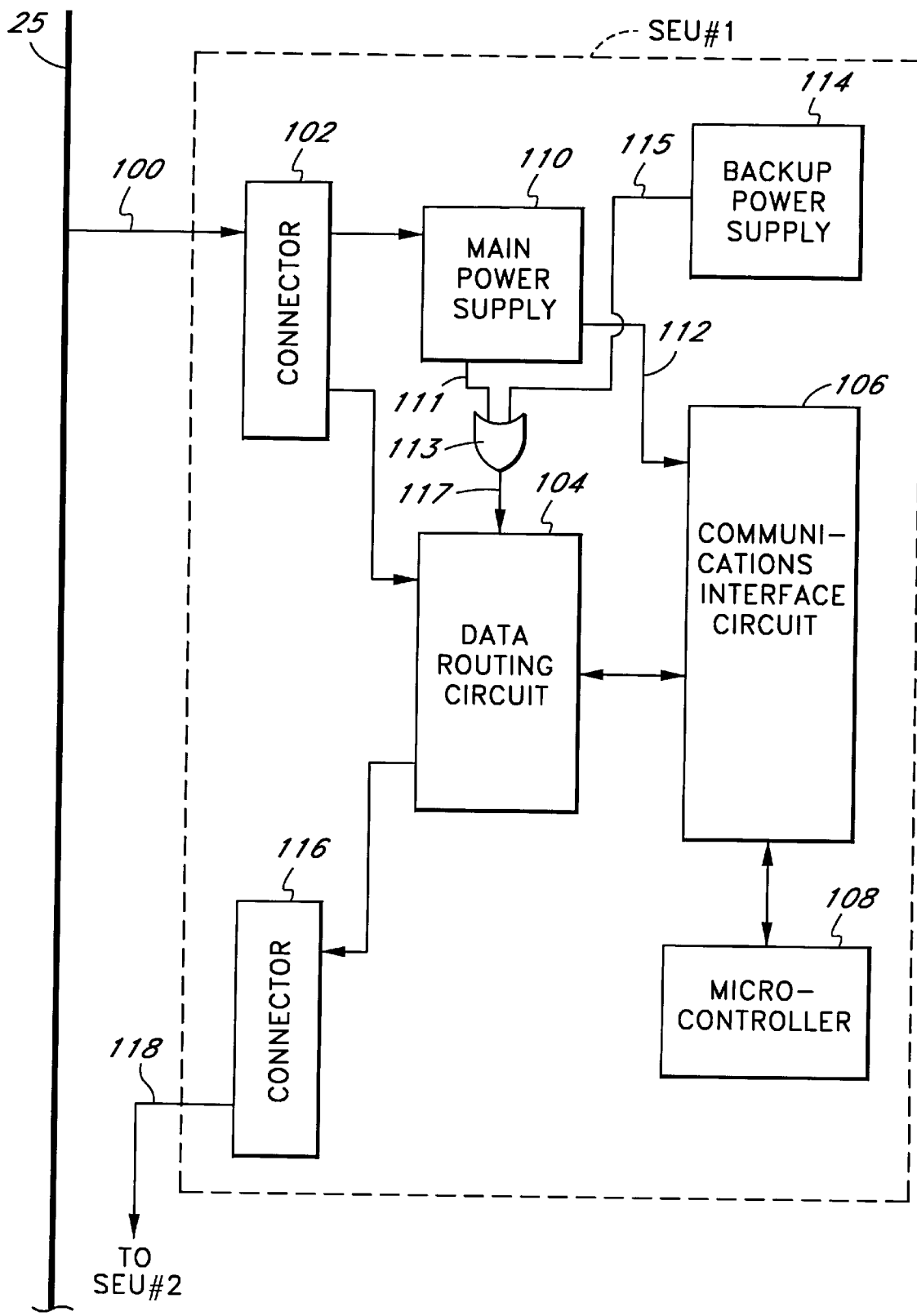
FIG. 2 is a detailed block diagram of a portion of the seat electronics unit of FIG. 1.

FIG. 2 is a detailed block diagram of portion of an SEU as shown in FIG. 1. For present discussion purposes, SEU#1 will be referred to, although the discussion will apply to any one of SEU#1, SEU #2, . . . and SEU#N. SEU#1 receives data or data signals from the central system 20 via central bus 25, which provides this data or data signals via signal line 100 to a connector 102 located in SEU #1. As used herein, the term "data" or "data signal" may include control signals, information signals and power signals. The received data is sent to a data routing circuit 104. Under normal conditions, the data routing circuit 104 routes the data to a communications interface circuit 106. In one embodiment, the communications interface circuit 106 may be a Universal Asynchronous Receiver/Transmitter circuit (UART) or an interface circuit implementing a field programmable gate array (FPGA). The communications interface circuit 106 operates under the control of a microcontroller 108 to process data and to perform other functions including the provision of control and enable signals for the data routing circuit 104.

A main power supply 110 located within SEU#1 provides the supply voltage requirements of SEU#1 under normal conditions. A backup power supply 114 provides back up voltage to data routing circuit 104 in the event that the main power supply 110 fails. In particular, the main power supply 110 is coupled to OR gate 113 via signal line 111. A backup power supply 114 is also coupled to OR gate 113 via signal line 115. The OR gate 113 is subsequently coupled to the data routing circuit 104 via signal line 117. The backup voltage provided by the backup power supply 114 is a little lower than the voltage provided by the main power supply 110. Since the voltages respectively provided by the main power supply 110 and the backup power supply 114 to the data routing circuit 104 are coupled via OR gate 113 and signal line 117, the main power supply 110, when functional, provides the voltage requirements of the data routing circuit 104. In the event that main power supply 110 fails, backup voltage is automatically provided to the data routing circuit 104.

To indicate that it is functional, the main power supply 110 issues a sense signal via signal line 112 to communications interface circuit 106. Upon receiving the sense signal, the communications interface circuit 106 generates the appropriate control and enable signals to the data routing circuit 104 to direct the data routing circuit 104 to dispatch the received data to the communications interface circuit 106. Upon receiving the data, the communications interface circuit 106 forwards the data to the microcontroller 108, which copies the data into its main memory (not shown) for later retrieval and processing according to the needs of the passengers serviced by SEU#1. The originally received and unprocessed data is then directed back to communications interface circuit 106, which routes the data back to data routing circuit 104. The data routing circuit 104 henceforth dispatches the data to connector 116, which subsequently provides the data via signal line 118 to SEU#2.

In the event that the main power supply 110 fails, the communications interface circuit 106 will be placed in a default condition, so that the control and enable signals normally provided to data routing circuit 104 will be deasserted. This is an indication to the data routing circuit 104 that the received data should be forwarded to connector 116 via the data routing circuit 104, thus bypassing the communications interface circuit 106. In this manner, data transfer from the central system 20 to SEU#2 may be accomplished, despite the failure of the main power supply 110 in SEU#1.

Figure 3:
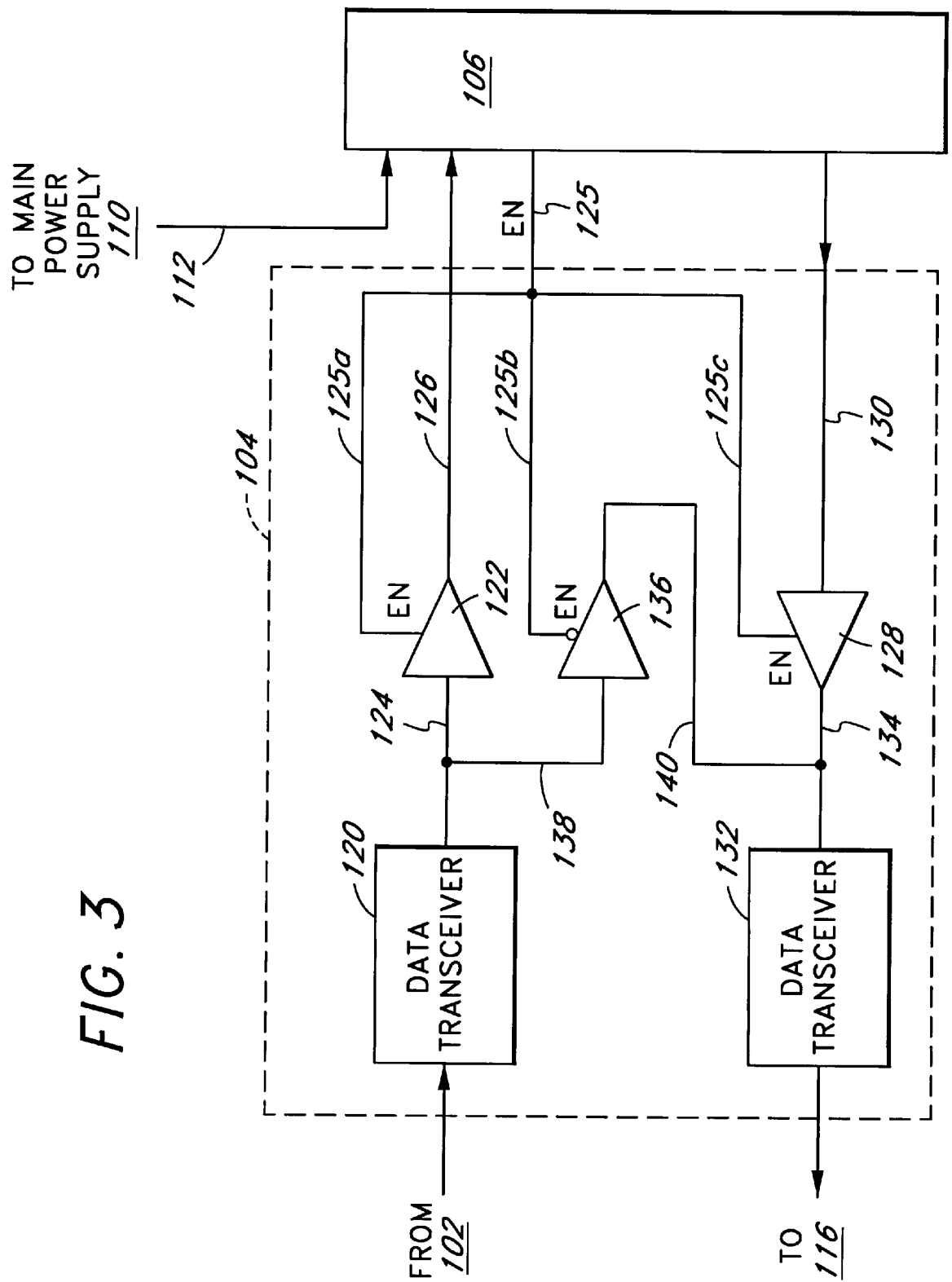
FIG. 3 is a schematic diagram of the data routing circuit 104 of FIG. 2.

FIG. 3 is a schematic diagram of the data routing circuit 104 of FIG. 2. The data routing circuit 104 includes a data transceiver 120 which receives data from connector 102 (FIG. 2). The data transceiver 120 is connected to a buffer 122 via signal line 124. The buffer 122 is enabled via an EN signal asserted by the communications interface circuit 106 via signal lines 125 and 125*a* when the communications interface circuit 106 receives a sense signal from the main power supply 110 via signal line 112, indicating that the main power supply 110 is operational. Thus, under normal conditions, when all devices are properly powered by the main power supply 110, the communications interface circuit 106 asserts a logic high EN signal to enable the buffer 122. When enabled, the buffer 122 provides the received data to the communications interface circuit 106 via signal line 126. The communications interface circuit 106 provides the data to microcontroller 108, which copies the data onto its memory and then returns the data back to communications interface circuit 106. The microcontroller 108 then processes the data according to the needs of the passengers in row 30$_1$.

The communications interface circuit 106 subsequently routes the originally received and unprocessed data to buffer 128 via signal line 130. The buffer 128 is also enabled by the EN signal provided by the communications interface circuit 106 via signal lines 125 and 125*c*. Accordingly, the buffer 128 channels the received data to the data transceiver 132, which henceforth dispatches the data to SEU#2 via connector 116.

In the event that the main power supply 110 (FIG. 2) malfunctions, the power supply 110 will no longer generate sense signal via signal line 112 to the communications interface circuit 106. Upon detection of this condition, the EN signal normally asserted by communications interface circuit 106 will be deasserted. This results in a logic low EN signal provided via signal line 125, which enables buffer 136 via signal line 125*b*, while disenabling buffers 122 and 128. Under these circumstances, data is routed from data transceiver 120 via signal line 138 to buffer 136, which reroutes the received data through signal line 140 to data transceiver 132. The data transceiver 132 then dispatches the data to SEU#2 via connector 116. In this manner, the in-flight entertainment programs may be routed to SEU#2 despite the failure of the main power supply in SEU#1.

Through the implementation of the principles of the present invention, the in-flight entertainment programs provided to a first SEU which is coupled in series to a second SEU may be transferred to the second SEU even in the event that a local power supply within the first SEU malfunctions. As a result, the interruption of in-flight entertainment services to passengers will be limited to the row of passengers serviced by the malfunctioning SEU.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A signal transferring circuit, comprising:
   a first terminal for receiving a data signal;
   a second terminal for transmitting the data signal;
   a first buffer having an input terminal and an output terminal, the input terminal being coupled to the first terminal, the first buffer being enabled to transfer the data signal from the first terminal to a predetermined destination under a first condition;
   a second buffer having an input terminal that is coupled to the predetermined destination and an output terminal that is coupled to the second terminal, the second buffer being enabled for transferring the data signal from the predetermined destination to the second terminal under the first condition; and
   a third buffer having an input terminal coupled to the first terminal and an output terminal coupled to the second terminal, the third buffer being enabled under a second condition to transfer the data signal from the first terminal to the second terminal.

2. The circuit of claim 1, further comprising a first power supply having an output terminal, a second power supply having an output terminal, and an OR gate having an output terminal, the output terminals of the first power supply and the second power supply being coupled as inputs to the OR gate, the output terminal of the OR gate being coupled to the first buffer, to the second buffer and to the third buffer.

3. The circuit of claim 2, wherein the first power supply supplies voltage to the first buffer, to the second buffer and to the third buffer under the first condition, and wherein the second power supply supplies voltage to the first buffer, to the second buffer and to the third buffer under the second condition.

4. The circuit of claim 3, wherein the predetermined destination is a processing unit that is coupled to receive a first sense signal from the first power supply indicative of the first condition, the processing unit enabling the first buffer and the second buffer, while disenabling the third buffer in response to the first sense signal.

5. The circuit of claim 4, wherein the processing unit is coupled to receive a second sense signal from the first power supply indicative of the second condition, the processing unit disenabling the first buffer and the second buffer, while enabling the third buffer in response to the second sense signal.

6. The circuit of claim 1, further comprising a first data transceiver and a second data transceiver, the first data transceiver being coupled to the first terminal at one end and being coupled to the input terminals of the first buffer and the third buffer at the other end, the second data transceiver being coupled to the second terminal at one end and to the output terminals of the second and the third buffers at the other end.

7. An electronic system for transferring a data signal, comprising:
    a first power supply that provides supply voltage, the power supply providing a first sense signal indicative of a first condition of the power supply, the first power supply also providing a second sense signal indicative of a second condition of the power supply;
    a processing unit coupled to the power supply; and
    a signal transferring circuit coupled to the power supply and to the processing unit, comprising:
        a first terminal for receiving a data signal;
        a second terminal for transmitting the data signal;
        a first buffer having an input terminal and an output terminal, the input terminal being coupled to the first terminal, the output terminal being coupled to the processing unit, wherein the processing unit enables the first buffer to transfer the data signal from the first terminal to the processing unit under the first condition;
        a second buffer having an input terminal that is coupled to the processing unit and an output terminal that is coupled to the second terminal, the second buffer being enabled by the processing unit for transferring the data signal from the processing unit to the second terminal under the first condition; and
        a third buffer having an input terminal coupled to the first terminal and an output terminal coupled to the second terminal, the third buffer being enabled by the processing unit under a second condition to transfer the data signal from the first terminal to the second terminal.

8. The electronic system of claim 7, further comprising a second power supply coupled to the signal transferring circuit for supply backup supply voltage under the second condition.

9. The electronic system of claim 7, further comprising a second power supply having an output terminal, and an OR gate having an output terminal, wherein the first power supply has an output terminal, the output terminals of the first power supply and the second power supply being coupled as inputs to the OR gate, the output terminal of the OR gate being coupled to the first buffer, the second buffer and the third buffer.

10. The electronic system of claim 8, wherein the supply voltage of the first power supply is higher than the supply voltage of the second power supply.

11. The electronic system of claim 7, further comprising a first data transceiver and a second data transceiver, the first data transceiver being coupled to the first terminal at one end and being coupled to the input terminals of the first buffer and the third buffer at the other end, the second data transceiver being coupled to the second terminal at one end and to the output terminals of the second and the third buffers at the other end.

12. A method of transferring data from a first terminal to a second terminal, comprising:
    receiving a data signal at a first terminal;
    enabling a first buffer coupled to the first terminal for transferring the data signal from the first terminal to a predetermined destination under a first condition;
    enabling a second buffer coupled to receive the data signal from the predetermined destination and for transferring the data signal from the predetermined destination to a second terminal under the first condition; and
    enabling a third buffer having an input terminal coupled to the first terminal and an output terminal coupled to the second terminal, the third buffer being enabled under a second condition to transfer the data signal from the first terminal to the second terminal.

13. The method of claim 12, wherein in enabling a first buffer and enabling a second buffer, the first condition is one in which supply voltage for the first, the second and the third buffers is provided by a primary power supply.

14. The method of claim 12, wherein in enabling a third buffer, the second condition is one in which supply voltage for the first, the second and the third buffers is provided by a backup power supply.

15. The method of claim 12, wherein enabling said first buffer comprises:
    receiving a sense signal indicative of a first operating condition of a primary power supply; and
    enabling a first buffer coupled to the first terminal for transferring the data signal from the first terminal to said predetermined destination under the first operating condition.

16. The method of claim 15, wherein in enabling a second buffer, the first operating condition is one in which supply voltage for the first, the second and the third buffers is provided by a primary power supply.

17. The method of claim 12, wherein enabling a third buffer comprises:
    receiving a sense signal indicative of a second operating condition of a primary power supply; and
    enabling said third buffer having an input terminal coupled to the first terminal and an output terminal coupled to the second terminal, the third buffer being enabled under the second operating condition to transfer the data signal from the first terminal to the second terminal.

18. The method of claim 17, further comprising providing supply voltage from a backup power supply in response to the second operating condition.

19. The method of claim 17, wherein in enabling a first buffer and enabling a second buffer, the predetermined destination is a processing circuit.

20. The method of claim 17, wherein in receiving, the data signal is received by a first data transceiver that has the first terminal, and wherein in enabling a second buffer and enabling a third buffer, the data signal is transferred to a second data transceiver that has the second terminal.

* * * * *